United States Patent [19]

Brückner et al.

[11] 4,250,704
[45] Feb. 17, 1981

[54] COMBINED GAS-STEAM POWER PLANT WITH A FUEL GASIFICATION DEVICE

[75] Inventors: Hermann Brückner; Werner Emsperger, both of Erlangen, Fed. Rep. of Germany

[73] Assignee: Kraftwerk Union Aktiengesellschaft, Mülheim, Fed. Rep. of Germany

[21] Appl. No.: 64,755

[22] Filed: Aug. 8, 1979

[30] Foreign Application Priority Data

Aug. 16, 1978 [DE] Fed. Rep. of Germany ....... 2835852

[51] Int. Cl.³ .......................... F02B 43/08; F02C 3/28
[52] U.S. Cl. ............................. 60/39.12; 60/39.18 B
[58] Field of Search ............ 60/39.12, 39.18 B, 39.02; 48/97 R

[56] References Cited

U.S. PATENT DOCUMENTS

| | | | |
|---|---|---|---|
| 3,704,587 | 12/1972 | Krieb et al. | 60/39.12 |
| 3,715,195 | 2/1973 | Tassoney et al. | 48/197 R |
| 3,728,093 | 4/1973 | Cofield | 48/197 R |
| 3,990,229 | 11/1976 | Staege | 60/39.12 |
| 4,019,314 | 4/1977 | Springmann | 60/39.12 |

OTHER PUBLICATIONS

Bond et al., "Kombiniertes Gas/Dampf-Turbinenkraftwerk mit Steinkohlen-Druckvergasungsanlage im Kraftwerk Kellermann in Lünen", in Brennstoff-Wärme-Kraft, Jun. 6, 1971.

Primary Examiner—Louis J. Casaregola
Attorney, Agent, or Firm—Herbert L. Lerner

[57] ABSTRACT

Combined gas-steam power plant, including a device for carrying out a gasification reaction at overpressure between oxygen and fuel fed to the gasification device, a heat exchanger and a charged steam generator disposed down stream of the gasification device in flow direction of fuel gas generated by the gasification device, a gas turbine receiving a flue gas stream from the steam generator, an air decomposition device having a first outlet line carrying oxygen to the gasification device and a second outlet line carrying nitrogen through the heat exchanger to the gas stream between the steam generator and gas turbine.

4 Claims, 1 Drawing Figure

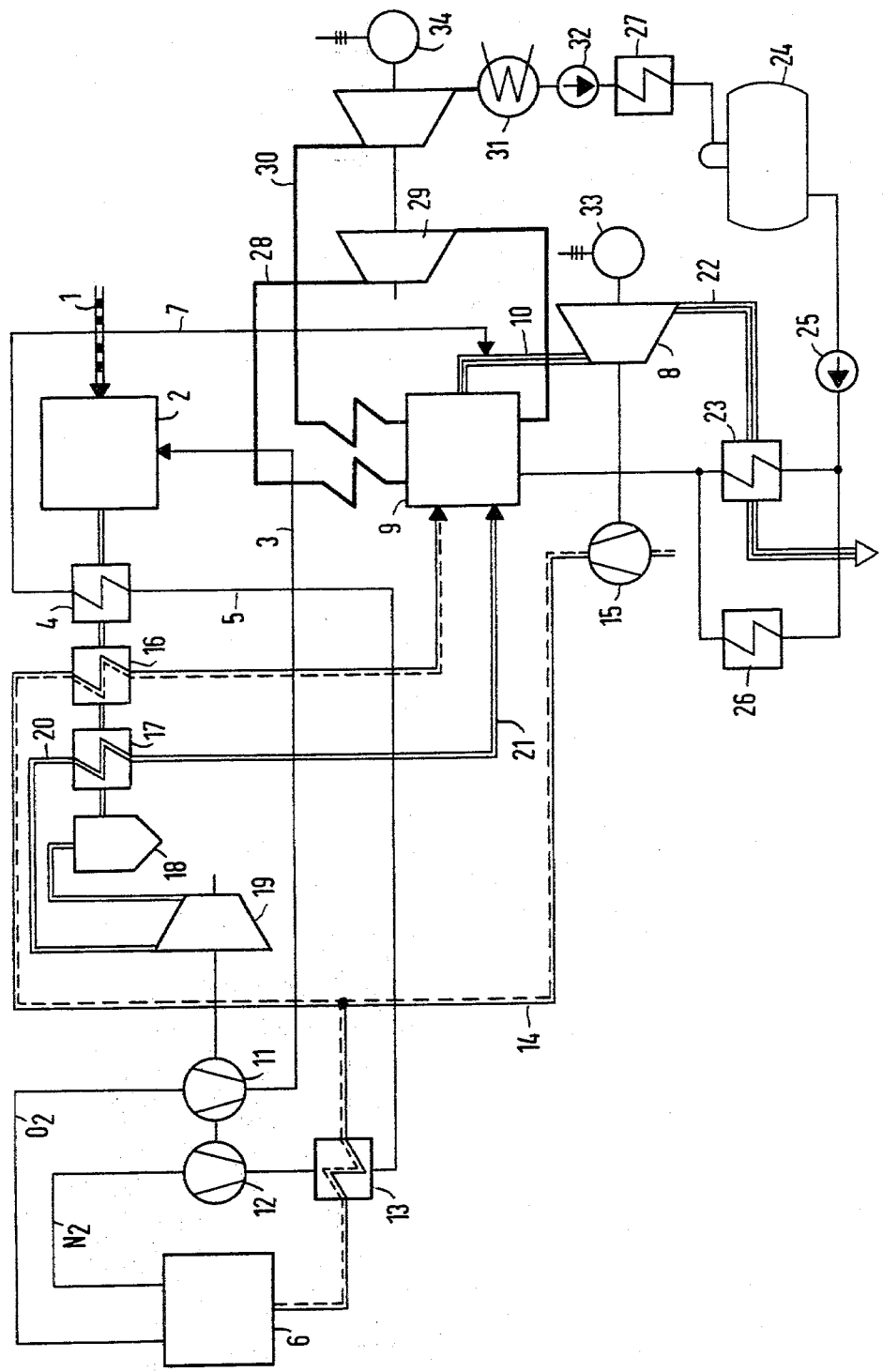

COMBINED GAS-STEAM POWER PLANT WITH A FUEL GASIFICATION DEVICE

The invention relates to a combined gas-steam power plant with a fuel gasification device preceding a charged steam generator, and with a gas turbine which follows the steam generator on the flue gas side, wherein a gasification reaction of the fuel with oxygen takes place in the gasification device at overpressure.

Such combined gas-steam power plant is described, for instance, in the journal "Brennstoff-Wärme-Kraft" 23 (1971), No. 6, June, on pages 258 to 262. In the device described therein, the fuel is gasified in a gasification device with the addition of air and purified in a purification device to the extent that it can be fed to a turbine. The device, however, presents problems with respect to cost and efficiency.

It is accordingly an object of the invention to provide a combined gas-steam power plant with a fuel gasification device which overcomes the hereinafore described disadvantages of the heretofore known devices of this general type and to achieve, on the one hand, a further improvement of the efficiency of the overall plant and to make it possible, on the other hand, to reduce the cost for the gas purification plant.

With the foregoing and other objects in view there is provided in accordance with the invention, a combined gas-steam power plant, comprising means for carrying out a gasification reaction at overpressure between oxygen and fuel fed to the gasification means, a heat exchanger and a charged steam generator disposed down stream of the gasification means in flow direction of fuel gas generated by the gasification means, a gas turbine receiving a flue gas stream from the steam generator, an air decomposition device having a first outlet line carrying oxygen to the gasification means and a second outlet line carrying nitrogen through the heat exchanger to the gas stream between the steam generator and gas turbine.

In accordance with another feature of the invention, there is provided a compressor driven by the gas turbine, and means for delivering air to the air decomposition device from a point down stream of the compressor.

In accordance with a further feature of the invention, there is provided a gas purification device disposed down stream of the heat exchanger in flow direction of the fuel gas, and a plurality of further heat exchangers disposed between the first-mentioned heat exchanger and the gas purification device for step-wise cooling of fuel gases.

In accordance with a concomitent feature of the invention, there is provided an expansion turbine disposed down stream of the purification device, and further compressors driven by the expansion turbine and disposed in the first and second outlet lines.

Other features which are considered as characteristic for the invention are set forth in the appended claims.

Although the invention is illustrated and described herein as embodied in Combined Gas-Steam Power Plant with a Fuel Gasification Device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings or the single FIGURE, in which the drawing is a schematic diagram of a combined gas-steam power plant with a fuel gasification device according to the invention.

Referring now particularly to the FIGURE of the drawing, it is seen that coal or oil is fed to a gasification device 2 through a pressure lock 1. The gasification device is at a pressure of about 20 bar and obtains oxygen through an oxygen-carrying first outlet line 3 from an air decomposition device 6. The gasification process is carried out by means of the oxygen from the line 3, which burns part of the fuel. The gasification device 2 is followed by a heat exchanger 4, which cools down the gases which leave the gasification device 2 with a temperature of approximately 1100 to 1700 K. Nitrogen serves as the heat-absorbing medium in the heat exchanger 4. The nitrogen is taken from the air decomposition device 6 through a second outlet line 5 and is fed into the gas stream through a line 7 ahead of the gas turbine 8 in the gas turbine process. In the embodiment example, the line 7 opens into the gas line 10 behind or down stream of a charged (i.e., being at overpressure) steam generator 9 and ahead or upstream of the gas turbine 8, which is upstream of the steam generator 9.

A compressor 11 is inserted into the outlet line 3 of the air decomposition device 6 to increase the pressure. A compressor 12 is likewise inserted into the second outlet line 5 of the air decomposition device 6. This compressor 12 is connected in series with a heat exchanger 13. A line connected to a second input of the heat exchanger 13 is also connected upstream of the air decomposition device 6 to cool the air. In the embodiment example, the air required by the air decomposition device 6 is branched off from a gas line 14, in which air with a pressure of about 12 bar flows. This pressure is generated by a compressor 15 coupled to the gas turbine 8. The gas line 14 leads to the charged steam generator 9 through a further heat exchanger 16 following or down stream of the gasification device 2.

The fuel gas generated in the gasification device 2 is thus cooled off into the heat exchangers 4 and 16. It further flows through still another heat exchanger 17 before it reaches a gas purification device 18 at a pressure of about 20 bar and a temperature of about 500 K. This gas purification device need be constructed only for a relatively small volume, since the nitrogen component of the air split-off in the air decomposition device 6 need not be conducted through the gas purification device 18. For adapting the pressure in the gas purification device to the pressure in the interior of the charged steam generator 9, the gas purification device is followed by an expansion turbine 19 which drives the compressors 11 and 12. From the expansion turbine 19, the fuel gas flows through a line 20 into the heat exchanger 17 preceding or upstream of the gas purification device 18 and through a line 21, which likewise has a pressure of about 12 bar, into the charged steam generator 9.

After the fuel gas is burned in the steam generator 9 by means of air, the fuel gases enter the gas line 10, are mixed there with the heated-up nitrogen from the line 7, and are fed to the gas turbine 8. The decompressed gases are conducted to the outside through an exhaust gas line 22 and an exhaust gas heat exchanger 23. The exhaust gas heat exchanger 23 follows a feedwater tank 24 and a feed pump 25, so that feedwater for the charged steam generator 9 is warmed up in the exhaust gas heat exchanger 23. In addition the feed water can be preheated on the flue gas side or the low-pressure side.

On the feed water side, further heat exchanges 26, 27 are connected parallel or in series to the exhaust gas heat exchanger 23. These heat exchangers are heated in a manner known in the art by bleeder steam from the steam turbine. The steam generated in the steam generator 9 flows in the superheated state through a live-steam line 28, into the high-pressure part of the steam turbine 29. The steam is returned from there to the steam generator 9 for reheating and is fed through a steam line 30 to the low-pressure part of the steam turbine 29. From the low-pressure part of the steam turbine 29, the steam flows into a condenser 31, is condensed there and is fed back again into the feedwater tank 24 by way of a pump 32 and the heat exchanger 27. The electric current is generated in generators 33 and 34.

Connecting the air decomposition device 6 to the air compressed in the compressor 15 has the advantage that the compressor of the gas process is utilized simultaneously for supplying the air required for the air decomposition device 6. Because of the larger output of the compressor 15, the efficiency for the precompression of the air is therefore higher than if a separate compressor were used. The special advantage of a reduction of the volume of the gas purification device 18, while at the same time improving the cooling of the fuel gases produced in the gasification device 2, is obtained, however, by the air decomposition device 6 in conjunction with the heat exchanger 4 for heating the nitrogen and feeding the nitrogen into the gas stream. The nitrogen can be added to the gas stream as desired before or after the charged steam generator 9. Feeding the nitrogen in behind the charged steam generator, however, has the advantage that fewer nitrogen oxides are formed.

There are claimed:

1. Combined gas-steam power plant, comprising means for carrying out a gasification reaction at overpressure between oxygen and fuel fed to said gasification means, a heat exchanger and a charged steam generator disposed down stream of said gasification means in flow direction of fuel gas generated by said gasification means, a gas turbine receiving a flue gas stream from said steam generator, an air decomposition device having a first outlet line carrying oxygen to said gasification means and a second outlet line carrying nitrogen through said heat exchanger to said gas stream between said steam generator and gas turbine.

2. Power plant according to claim 1, including a compressor driven by said gas turbine, and means for delivering air to said air decomposition device from a point down stream of said compressor.

3. Power plant according to claim 1, including a gas purification device disposed down stream of said heat exchanger in flow direction of the fuel gas, and a plurality of further heat exchangers disposed between said first-mentioned heat exchanger and said gas purification device for step-wise cooling of fuel gases.

4. Power plant according to claim 1, including an expansion turbine disposed down stream of said purification device, and further compressors driven by said expansion turbine and disposed in said first and second outlet lines.

* * * * *